US008015794B2

(12) United States Patent
Winkler et al.

(10) Patent No.: US 8,015,794 B2
(45) Date of Patent: Sep. 13, 2011

(54) VARIABLE AREA FLOW DUCT EMPLOYING SECONDARY FLOWS, AND METHOD THEREFOR

(75) Inventors: Chad M Winkler, Glen Carbon, IL (US); Matthew J Wright, Kirkwood, MO (US)

(73) Assignee: The Boeing Company, Chicago, IL (US)

( * ) Notice: Subject to any disclaimer, the term of this patent is extended or adjusted under 35 U.S.C. 154(b) by 1223 days.

(21) Appl. No.: 11/551,369

(22) Filed: Oct. 20, 2006

(65) Prior Publication Data

US 2008/0092518 A1    Apr. 24, 2008

(51) Int. Cl.
*F02K 3/02* (2006.01)
(52) U.S. Cl. ............... 60/204; 60/230; 60/262
(58) Field of Classification Search ............ 60/204, 60/242, 262, 271; 239/265.17
See application file for complete search history.

(56) References Cited

U.S. PATENT DOCUMENTS

| | | | |
|---|---|---|---|
| 4,358,074 A | 11/1982 | Schoen et al. | |
| 4,802,629 A | 2/1989 | Klees | |
| 5,222,359 A | 6/1993 | Klees et al. | |
| 5,294,055 A | 3/1994 | Garrett et al. | |
| 5,463,866 A | 11/1995 | Klees | |
| 5,529,263 A | 6/1996 | Rudolph | |
| 5,694,766 A | 12/1997 | Smereczniak et al. | |
| 5,761,899 A | 6/1998 | Klees | |
| 6,050,527 A * | 4/2000 | Hebert et al. | 244/210 |
| 6,459,481 B1 * | 10/2002 | Schaack | 356/241.1 |
| 6,751,944 B2 * | 6/2004 | Lair | 60/226.3 |
| 7,111,448 B2 * | 9/2006 | Anderson | 60/204 |

OTHER PUBLICATIONS

Winkler, C. M., Rani, S. L., and Vanka, S. P., "Large Eddy Simulations of Particle Dispersion by Turbulence Driven Secondary Flows in a Square Duct," *The 6th ASME-JSME Thermal Engineering Joint Conference*, Mar. 16-20, Kohala Coast, Hawaii, 2003.
Yagle, P. J., Miller, D. N., Ginn, K. B., and Hamstra, J. W., *Demonstration of Fluidic Throat Skewing for Thrust Vectoring in Structurally Fixed Nozzles*, J. of Engineering for Gas Turbines and Power, 123(3), pp. 502-507, Jul. 2001.

* cited by examiner

*Primary Examiner* — Michael Cuff
*Assistant Examiner* — Vikansha S Dwivedi
(74) *Attorney, Agent, or Firm* — Harness, Dickey & Pierce, P.L.C.

(57) ABSTRACT

A variable area flow duct and method. In one embodiment the flow duct includes a plurality of helical vanes arranged around an interior surface wall of the flow duct. The vanes cause secondary flow vortices to be developed in the vicinity of each of the vanes that effectively reduce the interior cross-sectional area of the duct that a primary flow sees as it flows through the duct. In various embodiments fluidic injection is employed to suppress the formation of the secondary flow vortices during certain phases of operation, for example, during an afterburn phase of operation of a jet aircraft engine which the flow duct is being used with. In another embodiment, an ablative coating is used over the vanes to suppress the formation of the secondary flow vortices. The ablative material is removed by the hot fluid flow during an afterburn phase of operation, thus exposing the vanes and enabling the subsequent formation of secondary flow vortices to narrow the cross-sectional area of the throat.

24 Claims, 11 Drawing Sheets

VARIABLE AREA FLOW DUCT EMPLOYING SECONDARY FLOWS, AND METHOD THEREFOR

FIELD

The present disclosure relates to flow ducts and, more particularly, to a variable area flow duct that employs secondary flows to enable the cross-sectional flow area of the duct to be varied as needed.

BACKGROUND

The statements in this section merely provide background information related to the present disclosure and may not constitute prior art.

For many advanced mobile platforms, for example, aircraft and missiles, an engine exhaust nozzle with a fixed geometry is often desired to reduce costs, weight, complexity and to improve survivability. However, many of these systems require nozzle throat area variation, thrust vectoring, and efficient mixing of cool bypass air and hot core flow air. These requirements are difficult to meet with presently available, fixed nozzle geometry designs.

Several key design issues exist when dealing with nozzles with variable throat area. Complexity of the design often limits the platform-to-platform transition for existing platforms, thus making it difficult or impossible to use a particular variable throat area nozzle for two or more common mobile platforms (for example, for two or more different models of aircraft). Also, achieving throat area control, thrust vectoring and efficient mixing typically requires separate systems that add cost and weight, as well as potentially decrease reliability. At present, there are generally two categories of nozzle throat area control devices, one being mechanical systems that involve linkage for mechanically adjusting nozzle throat area, and the other involving fluid property manipulation systems. Fluid property manipulation systems typically involve fluid injection into the throat of a flow nozzle in an attempt to alter the effective throat area of the flow nozzle.

Mechanical throat area control systems typically require rigidity in the nozzle/air frame integration since these system designs require the use of kinematic linkages. The additional parts required in a mechanical design tend to increase the system costs and weight. Moving parts can also have a negative impact on compatibility of different nozzle designs for different platforms. Furthermore, previously developed kinematic linkage systems for controlling throat area of a flow duct or a flow nozzle often do not simultaneously achieve throat area control, thrust vectoring and mixing.

Existing fluid property manipulations systems are often designed such that the fixed geometry represents the largest throat area required for afterburn (AB) nozzle operation. Local fluid properties within the flow nozzle are then altered through fluidic injection to change the effective nozzle throat area. These systems require bleed air from the engine to run in "a dry mode". This can rob the engine of critical efficiency during the longest segment of most missions, which is typically the cruise segment.

Existing fluidic vectoring designs often also develop compressive shock waves in the divergent section of a flow nozzle, which inefficiently turn supersonic flow. Throat skewing systems require short divergent sections to maintain vectoring efficiency. The short divergent section causes the divergent angle to be large for large area ratio nozzles, thus resulting in rapid expansion of the exhaust flow, which degrades efficiency. Therefore, existing fluidic vectoring designs are typically only applicable to low area ratio nozzles.

Previous systems do not address the need for cross-sectional area control, mixing, and vectoring simultaneously. Nor do previous fluidic nozzles circumvent the use of bleed air during the cruise portion of the mission. Thus, it would be highly desirable to incorporate the above capabilities into a single platform of fixed geometry.

SUMMARY

The present disclosure relates to a variable area flow duct or flow nozzle that can be employed with or without a fluidic injection system, and methods to forming a variable area duct or nozzle that is able to optionally employ fluidic injection.

In one embodiment, a flow duct is provided having a wall that includes an inner surface. The inner surface defines a fluid flow path for a primary flow flowing through the duct. At least one projection extends from an inner surface of the wall of the flow duct. The projection generates a secondary flow adjacent the inner surface as the primary flow flows through the duct. The secondary flow effectively reduces an internal cross-sectional area of the duct, as seen by the primary flow.

In one embodiment the above-described flow duct further includes at least one opening formed in the wall of the duct for injecting a fluid jet into the duct adjacent the projection. The fluid jet suppresses the formation of the secondary flow by the projection, thus maintaining the effective cross-sectional area at a maximum area, as seen by the primary flow.

In one embodiment the projection comprises a helical vane that extends from the inner surface of the wall of the flow duct. In another embodiment a plurality of spaced apart helical vanes are formed on the inner wall and arranged circumferentially around the inner surface of the wall to form a plurality of secondary flows that effectively reduce the cross-sectional throat area of the flow duct. In still another embodiment a plurality of openings are formed in the wall of the flow duct for injecting a plurality of fluid jets into the interior area of the flow duct adjacent the helical vanes, to thus generate a plurality of secondary flows in the vicinity of the helical vanes. The fluid jets suppress the formation of secondary flows within the duct, thus maintaining the effective cross-sectional throat area at a maximum area.

In yet another embodiment, a dissipative coating is provided over the projection formed on the inner surface of the wall of the duct. The dissipative coating is able to dissipate during a predetermined phase of operation for the flow duct, thus exposing the projection and thereafter enabling at least one secondary flow to be formed adjacent the projection for reducing the effective cross-sectional area of the flow duct.

Methods relating to controlling the flow of a fluid flowing through a duct are also described. One method involves forming a projection on the interior wall of the duct and flowing a fluid through the duct to form a primary flow. The projection is used to form a secondary flow in a vicinity of the projection, with the secondary flow causing an effective cross-section area of the duct to be reduced for the primary flow. An alternative method involves also injecting a fluid jet through a wall of the duct in a vicinity of the projection to suppress the formation of the secondary flow. Another alternative method involves coating the projection with a dissipative coating, for example an ablative coating, that dissipates during a predetermined phase of operation of the flow duct. The dissipative coating, while present, prevents the formation of secondary flows, and thus maintains a cross-sectional flow area at a maximum area.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

Figure 1:
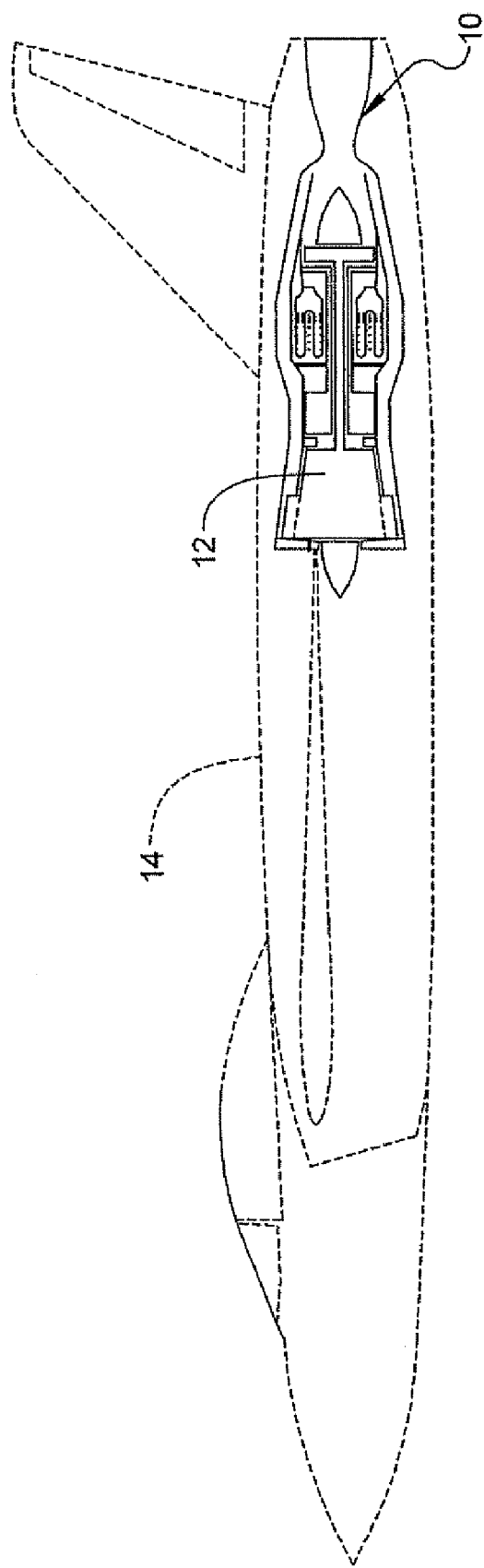
FIG. 1 is a simplified view of a mobile platform, in this example, a military aircraft, employing a flow nozzle in accordance with one embodiment of the present disclosure.

Referring to FIG. 1, there is shown a flow duct 10 being used in connection with an engine 12 of a mobile platform 14. In this example the mobile platform 14 forms a jet aircraft, but it will be appreciated that the teachings of the present disclosure can be used to form any form of flow duct or flow nozzle for a plurality of applications, such as for use with manned and unmanned airborne mobile platforms, missiles, or with virtually any application where it is desirable to control the cross-sectional area of a flow duct. Thus, while the following discussion may use the terminology "flow duct", it will be appreciated that the present disclosure is applicable to flow nozzles of any type, and particularly exhaust flow nozzles used with jet engines.

Figure 2:
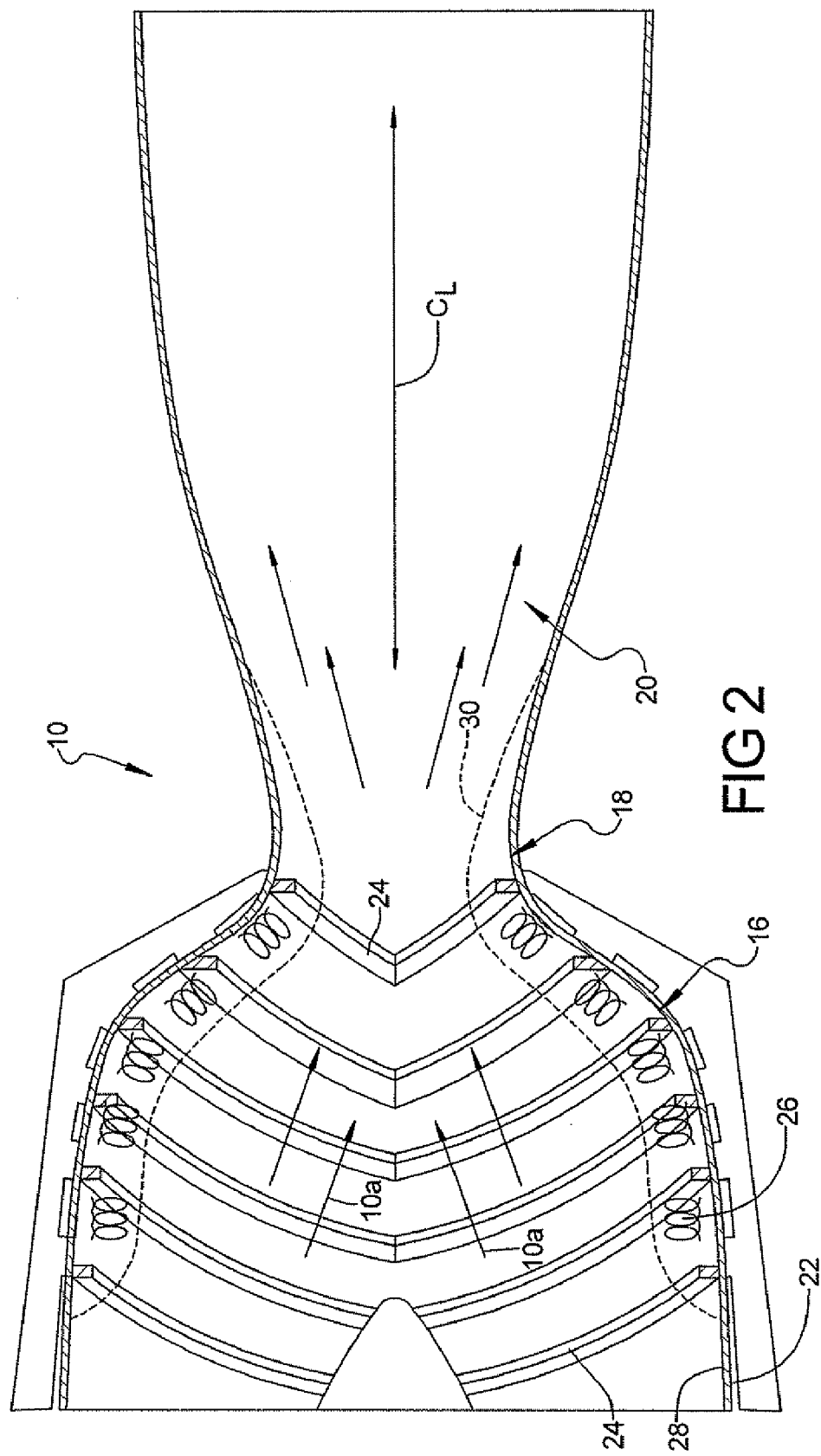
FIG. 2 is a simplified side cross-sectional view of the flow nozzle shown in FIG. 1 illustrating the helical vanes formed on the inner wall of the flow nozzle, as well as the secondary flow vortices caused by the helical vanes as the primary flow flows through the flow nozzle and further illustrating the effective narrowing of the cross-sectional area of the interior throat portion of the nozzle that the secondary flow vortices cause.

Referring to FIG. 2, a schematic cross-sectional side view of the flow nozzle 10 is presented. In this example, the flow duct 10 forms a flow nozzle having a converging section 16, a throat portion 18, and a diverging section 20. A plurality of projections in the form of helically extending vanes 24 each extend in a helical path along an interior surface 22. The vanes 24 are spaced apart from one another along a longitudinal axis of the flow duct 10 (i.e., along a centerline of the duct 10 as shown in FIG. 2). The vanes 24 may be continuous or discontinuous, circumferentially speaking, along the interior surface 22 of the flow duct 10. Put differently, one or more groups or segments of vanes 24 may be arranged in distinct, circumferential quadrants of the flow duct 10. For example, distinct segment of vanes 24 may be present in each one of four circumferential quadrants of the flow duct 10. It is understood that other types of projections which extend from the surface, such as bumps or ramps, do not depart from the scope of this invention. Also, it will be appreciated that the half of the flow nozzle 10 not shown in FIG. 2 may be symmetrical to that shown, or it may differ in the configuration of the vanes 24.

The vanes may be integrally formed from the same material as the flow duct 10, or alternatively may be formed from a different material in a subsequent manufacturing step. It is anticipated that integrally forming the vanes 24 with the flow duct 10 will likely be a preferred construction. The vanes 24 may vary significantly in dimensions, in one embodiment, the projected height from the flow duct 10 of the vanes 24 is twice the flow 10a boundary layer thickness, as determined using methods known by those skilled in the art. The vanes 24 may be formed with varying degrees of pitch, but in one form are arranged to extend at about a 45° slant relative to the longitudinal center line of the flow duct 10. The number of vanes 24 included over a given axial length of the flow duct 10 can also be varied to suit the needs of specific applications, but in one form, the vanes 24 may be spaced apart by distance of between about 0.5 inches-2 inches (12.7 mm-50.8 mm). While vanes having a helical configuration have been found to be particularly effective in inducing the secondary flow vortices, it will be appreciated that other configurations of vanes may also be used without departing from the scope of the present disclosure. For example, annularly parallel rows of vanes may be used. Further, all vanes do not need to have the same shape or path shape. There can be a different number of vanes, and each may be continuous around the flow duct, segmented, or a single shorter vane which extends only a portion of the duct circumference.

The helical vanes 24 provide a significant flow control benefit for the flow duct 10. As a primary fluid flow 10a flows through the flow duct 10, the helical vanes 24 cause secondary flow vortices 26 to be generated in the vicinity of each helical vane 24. The secondary flow vortices 26 obstruct available volume to have the effect of thickening a wall portion 28 of the flow duct 10. That effectively reduces the cross-sectional area inside the flow duct 10, as seen by the primary flow 10a.

Dashed line 30 indicates the effective interior wall as seen by the primary flow 10a. In this example, the cross-sectional area of the throat portion 18 is significantly reduced from what would otherwise be available without the secondary flow vortices 26 being present. The helical vanes 24 are especially advantageous as they enable the effective cross-sectional area of the flow duct 10 to be reduced without the need for any moving parts. This significantly simplifies the construction of the flow duct 10, leads to significantly increased reliability, reduces the overall cost of construction of the flow duct 10 and significantly reduces its overall weight.

Figure 3:
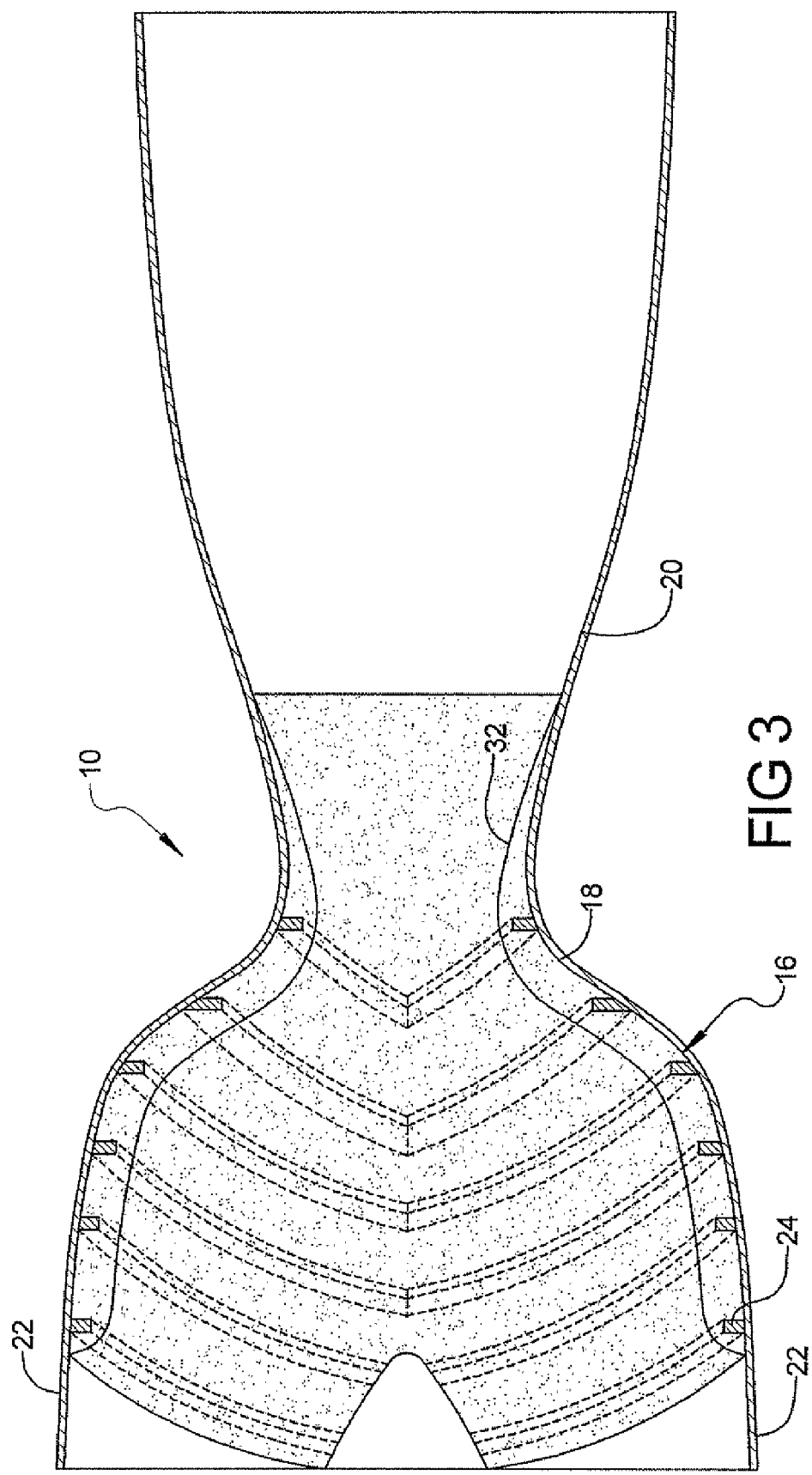
FIG. 3 is a view of the flow nozzle of FIG. 2, but with an ablative coating over the helical vanes to cover the vanes.

Referring to FIG. 3, the flow duct 10 is shown incorporating a dissipative coating 32 formed over the helical vanes 24. The dissipative coating 32 may comprise an ablative coating, for example, phenolic resin filled with silica dust. Any other material coating that will dissipate in response to a high temperature fluid flow through the flow duct 10 could be employed as well.

The dissipative coating 32 provides a significant benefit in that it enables the secondary flow of vortices 26 to be prevented from forming during an initial portion of operation of the flow duct 10, for example, during an afterburn phase of operation of the engine 12 shown in FIG. 1. The thickness of the dissipative coating 32 can be made such that at the end of an afterburn operation, the coating 32 is completely removed or dissipated by the intense heat of the flow through the flow duct 10. At that point, the helical vanes 24 will be fully exposed to the primary flow and will cause the secondary flow vortices 26 (FIG. 2) to be generated, thus effectively narrowing the cross-sectional throat area of the flow duct 10.

Still another alternative flow duct could employ the helical vanes 24 being formed from a first ablative material, and being coated with a different (i.e., second) ablative material. The second ablative material could be selected such that it burns off during a first phase of operation, with the helical vanes 24 then becoming exposed for a short period of time. The ablative material forming the helical vanes 24 would then burn off during a second phase of operation. Other variations could be employed to tailor the area of the throat of the flow duct 10 to meet specific operational phases of an aircraft or missile being used with the flow duct 10.

Figure 4:
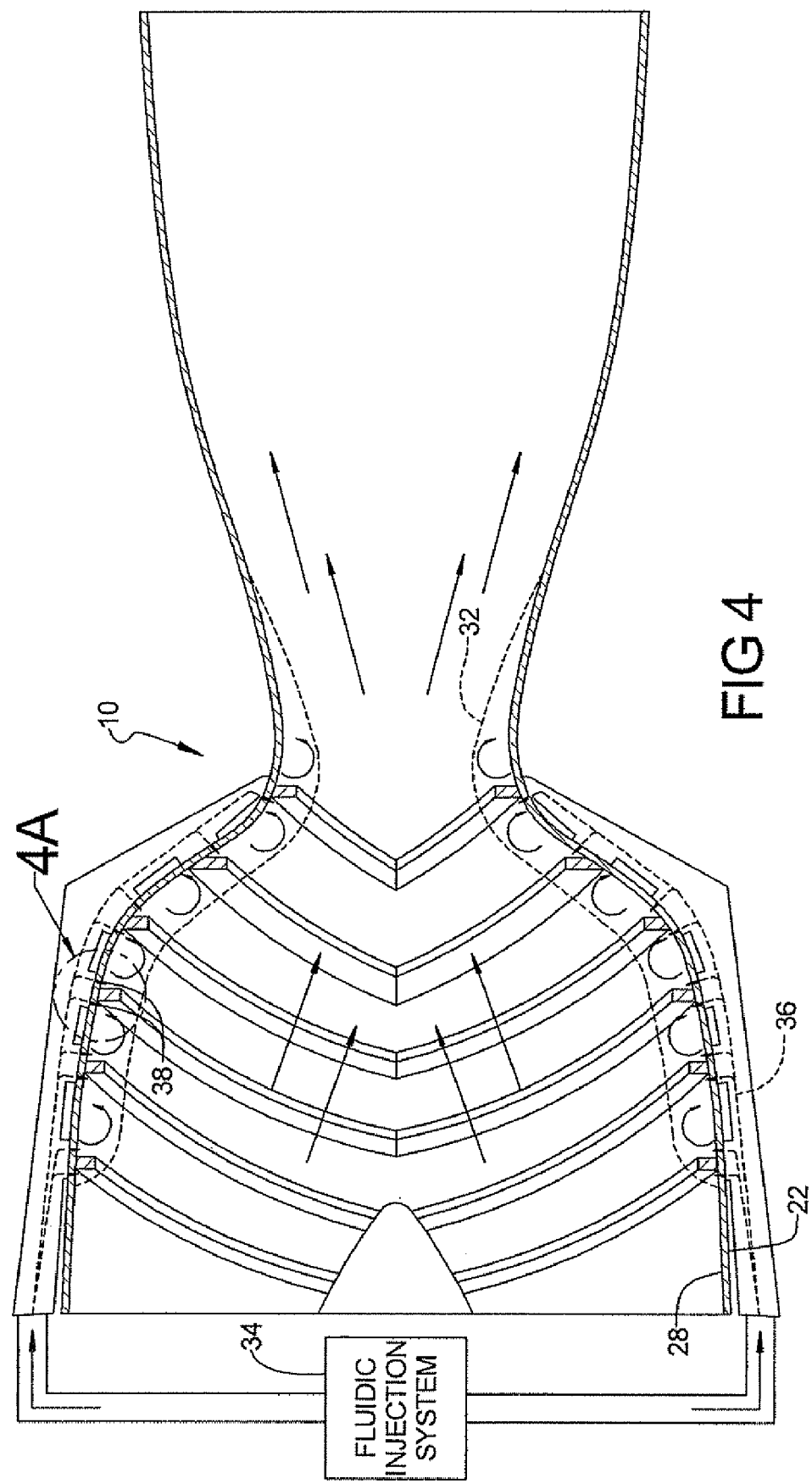
FIG. 4 is a view of the flow nozzle of FIG. 2, but with a plurality of fluid jets being injected into the nozzle to suppress the formation of the secondary flow vortices, and further illustrating the internal cross-sectional area of the throat of the nozzle at a maximum cross-sectional area.
Figure 4A:
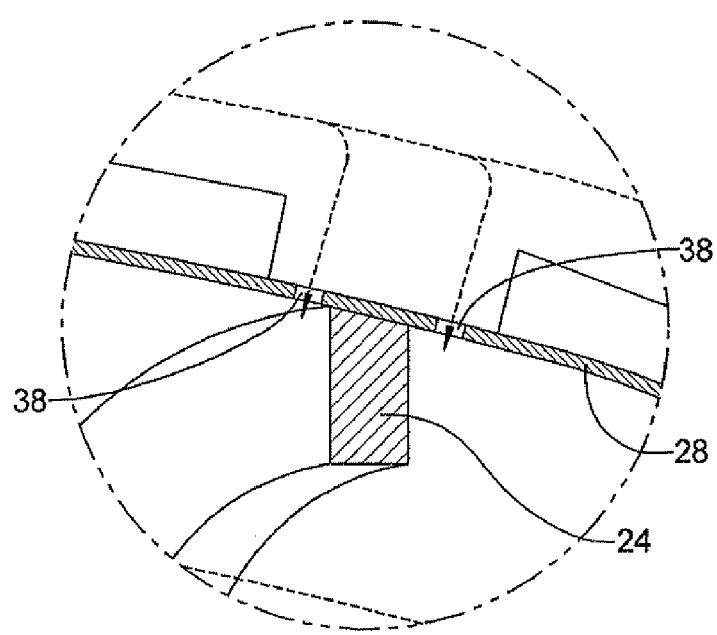
FIG. 4A is an enlarged view of circled portion 4A in FIG. 4.

Referring to FIG. 4, the flow duct 10 is shown incorporating a fluidic injection system 34 that enables a plurality of fluid jets to be injected at various points around the flow duct 10, adjacent to the helical vanes 24. The fluid jets are designated by dashed lines 36 and are preferably injected through openings 38 adjacent each of the helical vanes 24, as indicated in greater detail in FIG. 4A. In one embodiment, the openings 38 are formed to extend circumferentially around the entire wall 28. The fluid jets 36 effectively operate to suppress the formation of the secondary flow vortices 26 within the flow duct 10, thus maintaining the interior cross-sectional area of the flow duct 10 at a maximum. This serves to maintain the internal cross-sectional area at the throat 18 a maximum. Thrust vectoring can be achieved by selectively directing fluid jets 36 to various areas of the flow duct 10, for example, to various quadrants, to achieve thrust vectoring of the primary flow 10a. This cancels the secondary flows only in selected portions of the cross-section. It is understood that other formations of openings 38 around the wall 28, such as a plurality of openings or discreet segmented opening around the circumference of the entire wall 28, do not depart from the scope of this invention.

Figure 5:
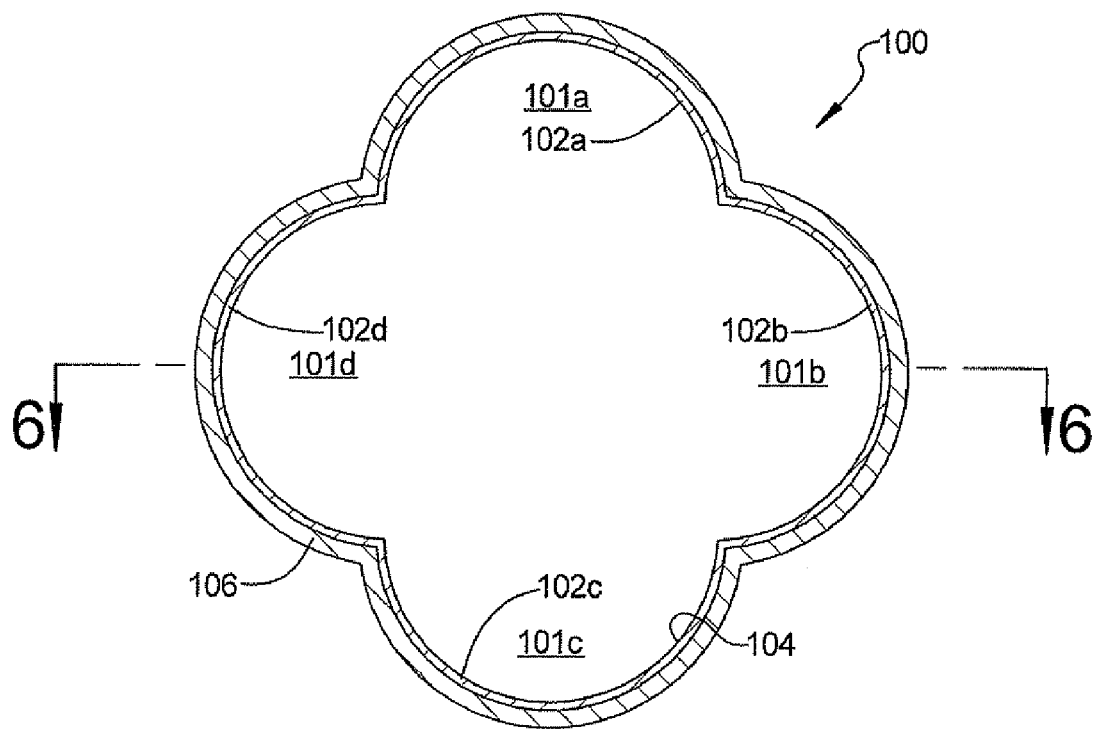
FIG. 5 is a cross-sectional end view of an alternative flow duct that also incorporates radial vanes that form secondary flow vortices.
Figure 6:
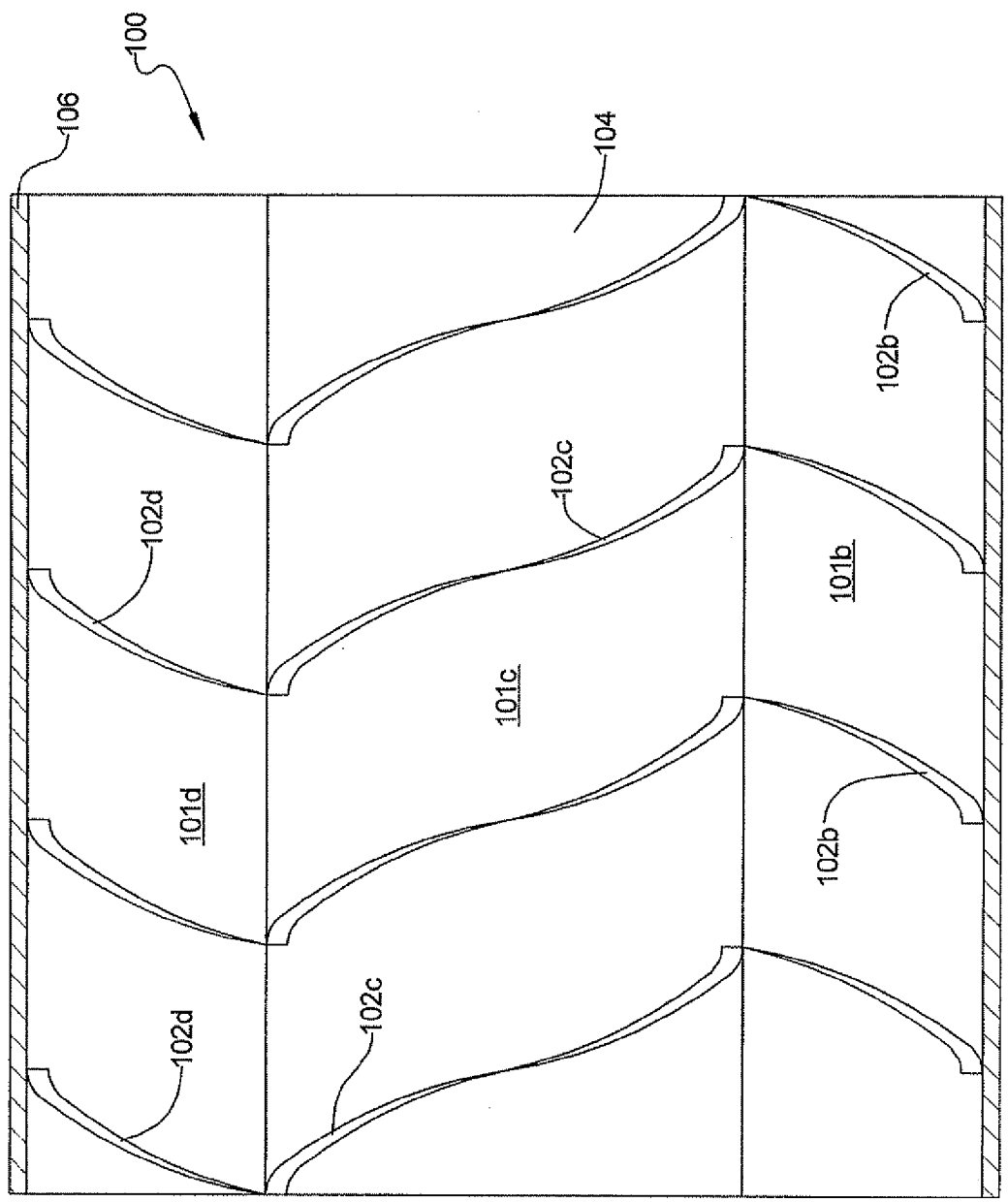
FIG. 6 is a top cross-sectional view of the flow duct of FIG. 5 taken in accordance with section line 6-6 in FIG. 5, illustrating the radially extending vanes.
Figure 7:
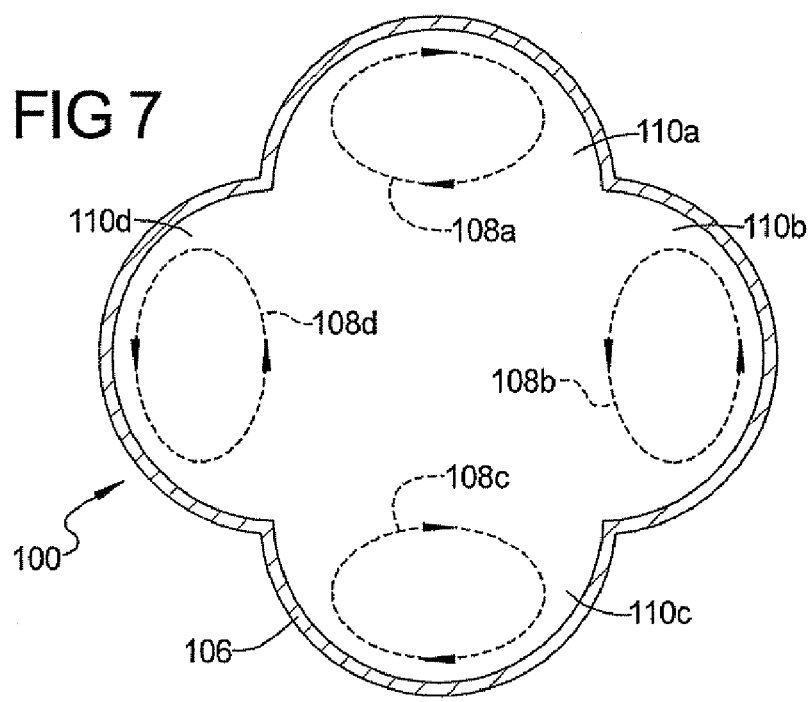
FIG. 7 is a simplified schematic view of the flow duct of FIG. 5 illustrating the secondary flow vortices that develop in each of four lobes of the flow duct to significantly reduce the effective cross-sectional area of the flow duct.

Referring now to FIGS. 5 and 6, a flow duct 100 in accordance with an alternative embodiment of the present disclosure is illustrated. From FIG. 5, it can be seen that the flow duct 100 is not perfectly circular, but rather includes four distinct lobes or quadrants 101a-101d, each having a helical vane 102a, 102b, 102c, 102d respectively extending from an interior surface 104 of the wall portion 106. FIG. 7 shows a simplified schematic drawing of the flow duct 100 illustrating vortices 108a, 108b, 108c and 108d that are formed in each lobe 101a-101d of the flow duct 100. The secondary flow vortices 108a-108d provide a significant advantage in that they promote mixing of the fluid flowing through the flow duct 100. Essentially, each secondary flow vortex 108a-108d operates to constantly bring fluid from the wall portion 106 of the duct 100 to the center of the duct along one bi-sector, and from the center of the duct towards the wall portion 106 along the other bi-sector. Thus, fluid in each of the four lobes 101a-101d is well mixed because of the secondary flow vortices 108a-108d.

Figure 8:
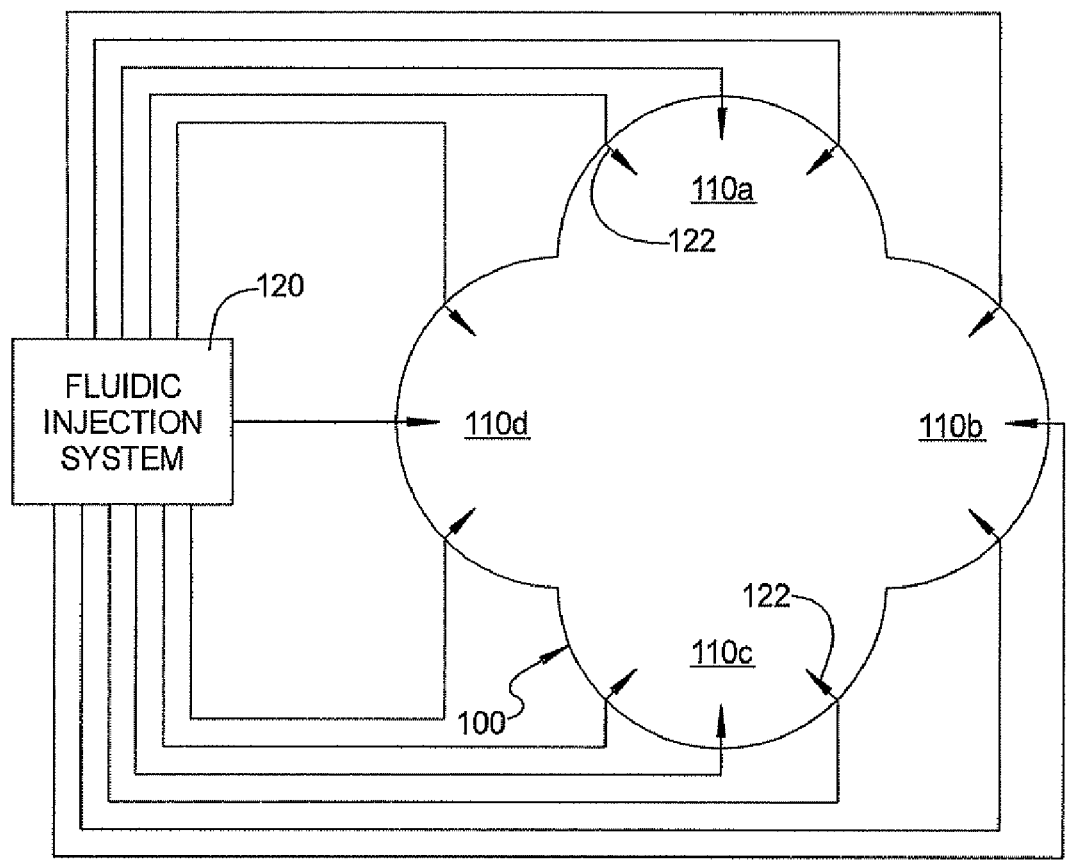
FIG. 8 is a simplified schematic view of the flow duct of FIG. 7 illustrating the application of a plurality of fluid jets to suppress the formation of the secondary flow vortices in each of the four lobes.

FIG. 8 illustrates a fluidic injection system 120 applied to the flow duct 100 to generate a plurality of fluid jets 122 within each of the lobes 101a-101d. The fluid jets 122 suppress the formation of the secondary flow vortices 108a-108d to maintain the interior cross-sectional area of the flow duct 100 at a maximum value.

Figure 9:
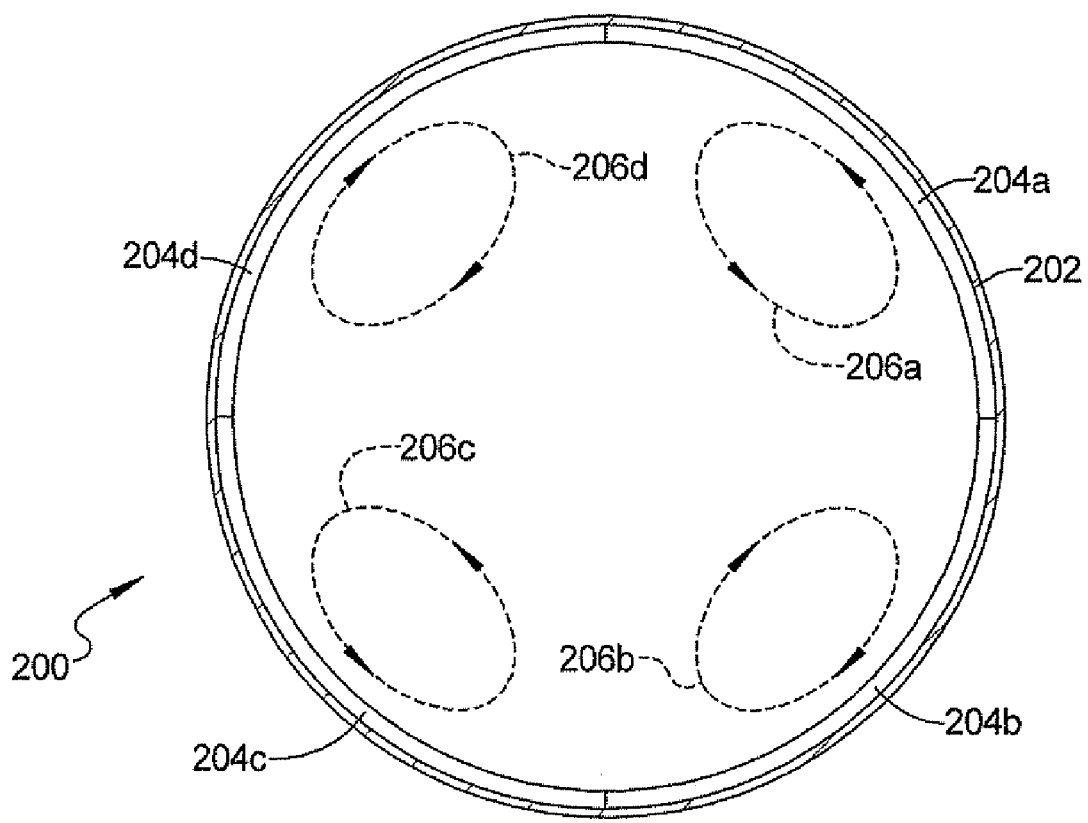
FIG. 9 is a cross-sectional end view of a circular flow duct illustrating four helical vanes formed on an interior surface wall of the duct, and the corresponding four secondary flow vortices formed within the duct.

Referring to FIG. 9, a flow duct 200 in accordance with another alternative embodiment of the present disclosure is illustrated. Flow duct 200 comprises a circumferential wall 202 having four helically extending vane segments 204a-204d extending from the interior surface of the wall 202 of the flow duct 200. Helical vanes 204a-204d generate secondary flow vortices 206a-206d, respectively, within each of four lobes of the flow duct 200. Again, with the flow duct 200, fluidic injection could be used as described in connection with FIGS. 4 and 8 to suppress the formation of the secondary flow vortices 206a-206d and/or to implement thrust vectoring.

Figure 10A:
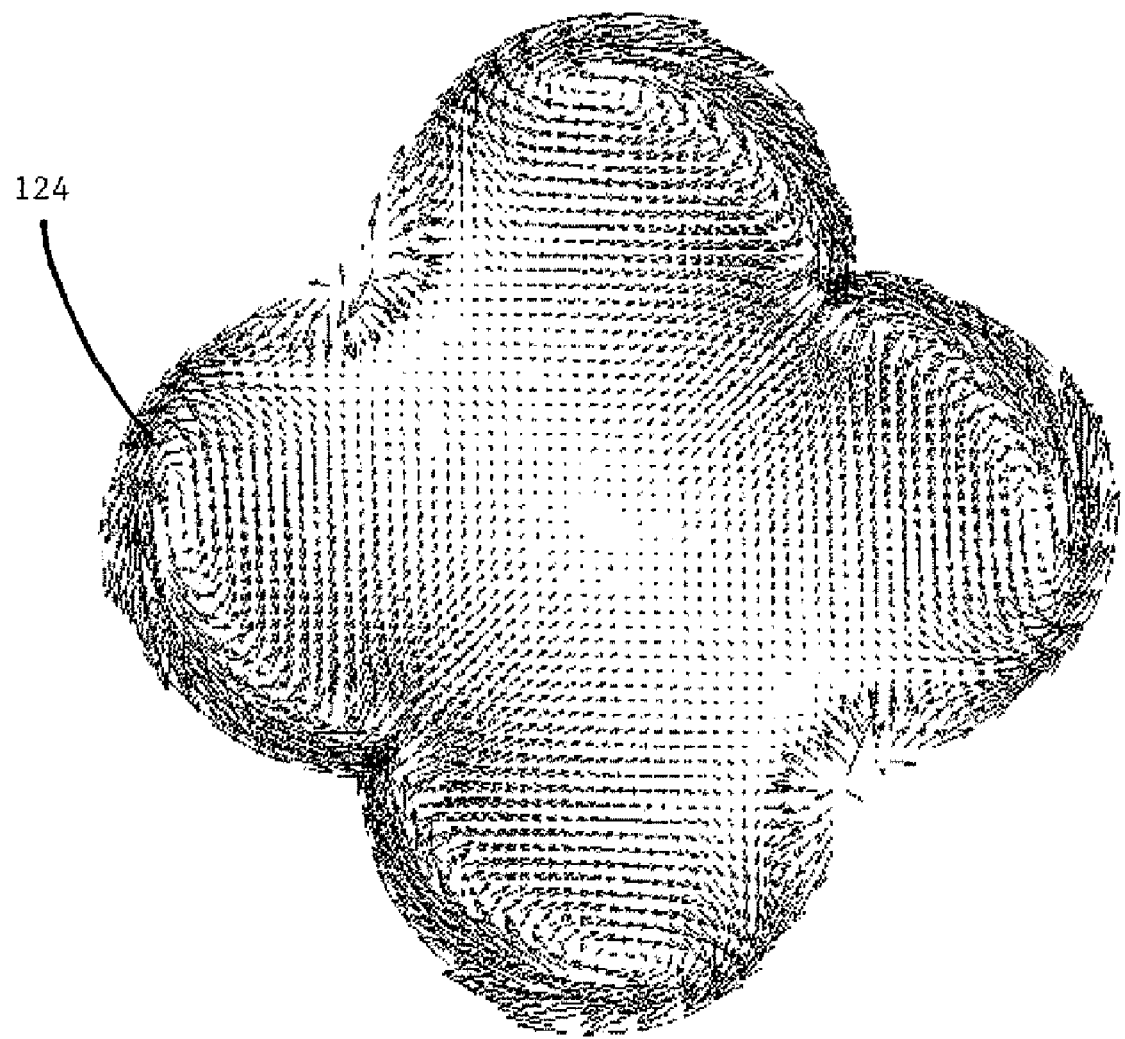
FIGS. 10A-10C illustrate cross-sectional velocity vectors for the flow duct of FIG. 7 for cruise, afterburn, and vectoring conditions, respectively.
Figure 10B:
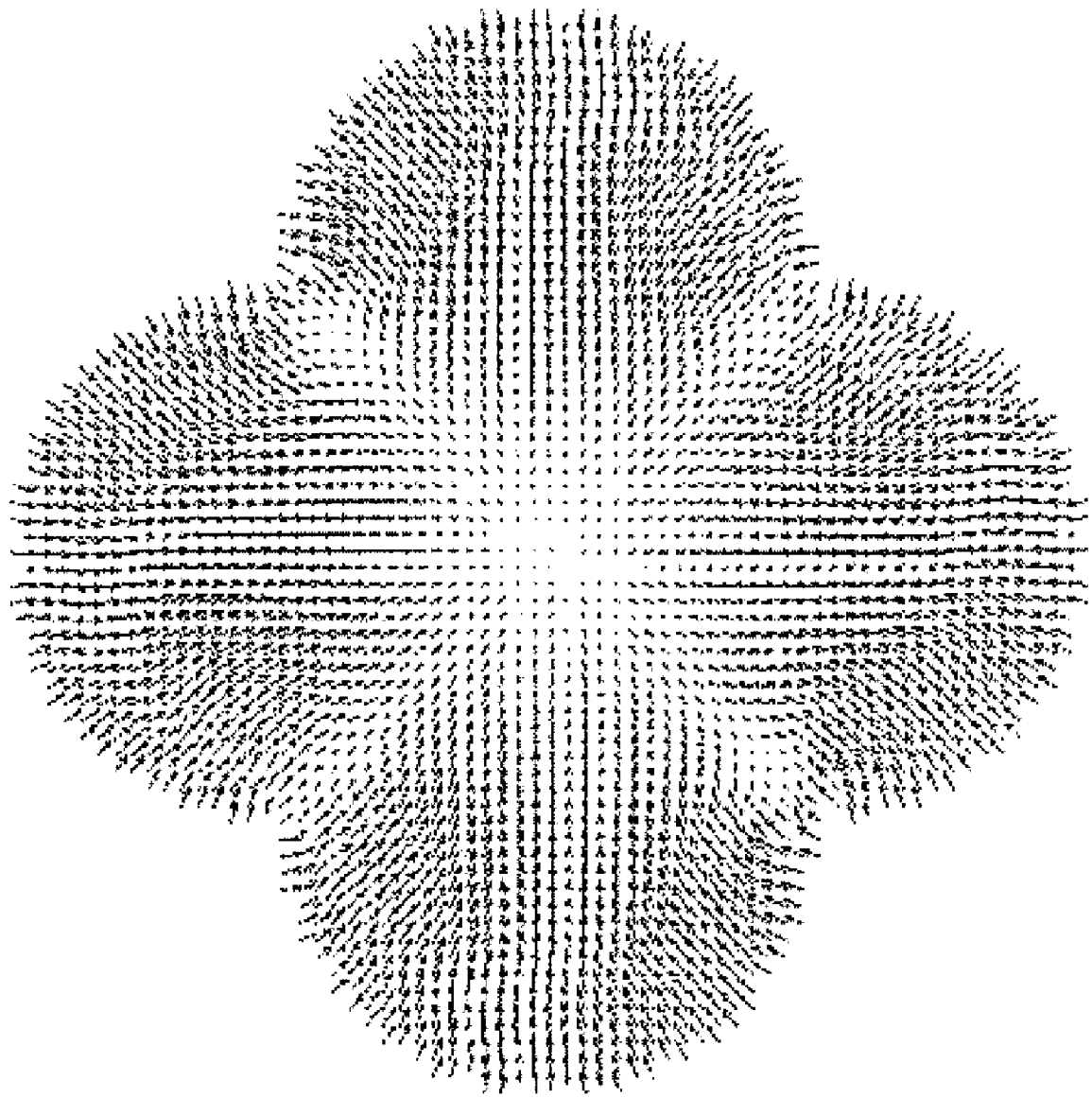
Figure 10C:
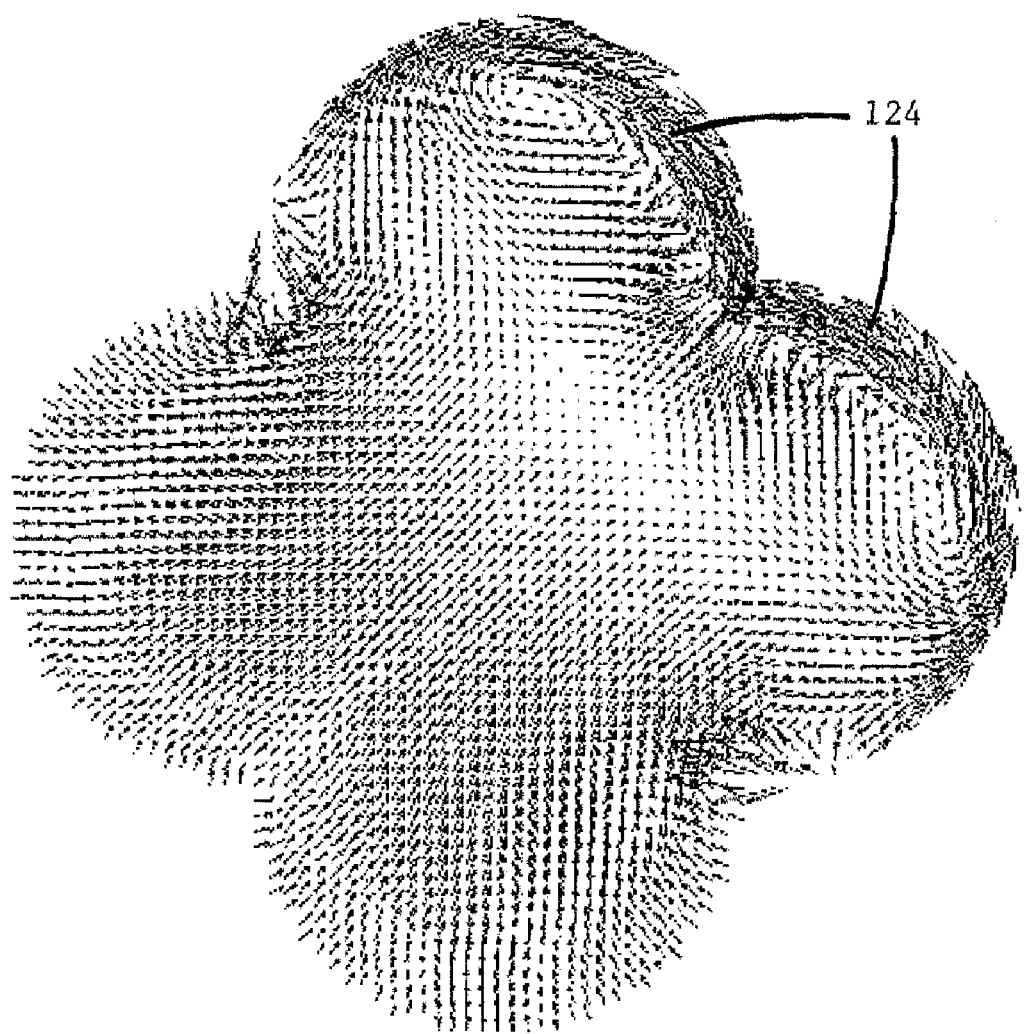

Referring now to FIGS. 10A-10C, simulations of the velocity vectors for a flow through the flow duct 100 are illustrated to demonstrate throat area control accomplished with the flow duct 100. The simulations of FIGS. 10A-10C assume a straight duct with helical vanes extending at a 45° pitch and with a 0.5 inch (12.7 mm) height. While the various embodiments of the flow duct presented herein are applicable over a wide range of Mach numbers and altitudes, the simulations of FIGS. 10A-10C are intended to simulate the duct 100 blowing into a Mach 3.5 flow at an altitude of 70,000 feet (21,233 meters). The duct 100 is assumed to be connected to a jet engine which has exit properties at a total pressure and total temperature of 43.46 PSI and 1627 R, respectively.

In FIG. 10A, the cross-sectional velocity vectors are shown for the typical cruise condition where no fluidic jets (such as jets 122 in FIG. 8) are active. Note the strong secondary flows generated by the helical vanes 102a-102d, as manifested by the darkened area 124. In FIG. 10B, fluidic injection is applied uniformly across the cross-section of flow duct 100 (as explained in connection with FIG. 8). This buffers the vanes 102a-102d and prevents the secondary flow vortices from forming. Thus, the internal cross-sectional area of the flow duct 100 is maximized. This would be a preferred flow pattern during an afterburn operation. In FIG. 10C, the ability to selectively suppress the secondary flows in the duct 100 via fluidic injection is illustrated. Secondary flow vortices are generated in only selected portions of the flow duct 100. This operation would be performed during a thrust vectoring operation. Note that the effective cross-sectional area for the flow duct 100 in FIG. 10C is increased only within lobes 110c and 110d of the flow duct 100. Darkened portion 124 along lobes 110a and 110b indicates the presence of secondary flows that are effectively thickening the wall of the duct 100.

The various embodiments thus enable the effective throat area of a flow duct to be controlled as needed to achieve throat area variation of a flow nozzle for various phases of flight of an aircraft, missile, or other mobile platform. The various embodiments of the present disclosure are not limited to use with aircraft or missiles, but are readily adaptable with little or no modification to other applications involving fluid flow control through a duct. The various embodiments described herein also promote thorough mixing of a flow through a duct with the advantage of little or no moving parts being required to achieve the flow control.

While various embodiments have been described, those skilled in the art will recognize modifications or variations which might be made without departing from the inventive concept. The examples illustrated in the present disclosure are not intended to the description provided herein. Therefore, the description and claims should be interpreted liberally with only such limitation as is necessary in view of the pertinent prior art.

What is claimed is:

1. A flow duct comprising:
   a circumferential wall having an inner surface, the inner surface defining a fluid flow path for a primary flow flowing through the flow duct; and
   at least one curving projection forming a non-moveable vane, and formed to project from the circumferential wall of the inner surface of the flow duct such that the non-moveable vane projects radially inwardly toward an axial center of the flow duct and non-parallel to a longitudinal centerline extending along the axial center of the flow duct, the non-moveable vane for generating a secondary flow adjacent the inner surface that effectively reduces an internal cross-sectional area of the duct for said primary flow.

2. The flow duct of claim 1, wherein said non-moveable vane extends in a helical path from the inner surface of the circumferential wall of the flow duct.

3. The flow duct of claim 1, further comprising a plurality of longitudinally spaced apart, non-moveable vanes arranged on said inner surface of the circumferential wall of the flow duct, with each of said non-moveable vanes forming a helical vane.

4. The flow duct of claim 1, further comprising at least one opening formed in said circumferential wall of said flow duct for injecting a fluid jet into said flow duct adjacent said non-moveable vane, the fluid jet suppressing the formation of said secondary flow by said non-moveable vane.

5. The flow duct of claim 1, further comprising a coating applied to said inner surface to at least partially cover said non-moveable vane, to at least partially impede the formation of said secondary flow; and
   the coating being able to be dissipated during a predetermined phase of use of the flow duct, to then enable said non-moveable vane to form said secondary flow.

6. The flow duct of claim 1, wherein said flow duct comprises an exhaust nozzle of a jet engine.

7. The flow duct of claim 1, further comprising a plurality of axially spaced apart projections arranged circumferentially on said inner surface of said wall of said duct, each of said projections forming a helical vane.

8. The flow duct of claim 6, further comprising a plurality of openings formed in said wall adjacent said helical vanes for enabling a plurality of fluid jets to be directed into said duct, said fluid jets suppressing the formation of secondary flows adjacent each of said helical vanes.

9. A flow duct comprising:
   a circumferential wall having an inner surface, the inner surface defining a fluid flow path of a primary flow flowing through the flow duct;
   a plurality of non-moveable vanes extending radially inwardly toward an axial center of the flow duct from said inner surface of the circumferential wall, and further such that said non-moveable vanes extend non-parallel to a longitudinal centerline of the flow duct, the non-moveable vanes generating a plurality of secondary flows adjacent the inner surface that reduce an internal cross-sectional area of the flow duct for said primary flow; and
   a plurality of fluid jets controllably injected through openings in said circumferential wall adjacent said non-moveable vanes, for suppressing the formation of said secondary flows.

10. The flow duct of claim 9, wherein at least some of said non-moveable vanes comprise helical vanes projecting from said inner surface.

11. The flow duct of claim 10, wherein at least some of said helical vanes are arranged generally at an angle relative to a longitudinal centerline extending through said flow duct.

12. The flow duct of claim 9, further comprising a dissipative coating covering at least a subplurality of said non-moveable vanes that prevents the formation of said secondary flows.

13. The flow duct of claim 12, wherein said dissipative coating comprises an ablative coating.

14. A method for controlling a flow of a fluid flowing through a duct, comprising:
   forming a non-moveable vane on an interior circumferential wall of said duct such that said non-moveable vane projects radially inwardly toward an axial center of said duct and non-parallel to a longitudinal centerline of said duct;
   flowing a fluid through said duct to form a primary flow; and
   using said non-moveable vane to form a secondary flow adjacent said non-moveable vane, said secondary flow causing a reduction of an effective cross sectional area within said duct for said primary flow.

15. The method of claim 14, further comprising:
   injecting a fluid jet through said interior circumferential wall of the duct in a vicinity of said non-moveable vane to suppress the formation of said secondary flow.

16. The method of claim 14, further comprising:
   using a dissipative coating to cover said non-moveable vane to prevent said secondary flow from forming; and
   causing said dissipative coating to dissipate during a predetermined phase of use of said duct, to thus expose said non-moveable vane and enable the formation of said secondary flow.

17. The method of claim 14, wherein the forming a non-moveable vane on said interior circumferential wall comprises forming a helical vane on said interior circumferential wall.

18. The method of claim 14, further comprising using a plurality of non-moveable vanes spaced apart from another, and arranged generally circumferentially about said interior circumferential wall of said duct, to cause a corresponding plurality of secondary flows adjacent said plurality of non-moveable vanes.

19. The method of claim 18, further comprising injecting a plurality of fluid jets through said interior circumferential wall of said duct at areas adjacent to each one of said plurality of non-moveable vanes to generate a plurality of secondary flows within said duct.

20. A mobile platform comprising:

an engine;

an exhaust nozzle operably associated with said engine to receive a primary fluid flow from said engine;

said exhaust nozzle having a circumferential inner surface, the circumferential inner surface defining a fluid flow path for said primary flow; and a plurality of non-moveable vanes extending from said circumferential inner surface radially inwardly toward an axial center of said exhaust nozzle, and non-parallel to a longitudinal centerline of said exhaust nozzle, for generating a plurality of secondary flows adjacent said circumferential inner surface that effectively reduce an internal cross-sectional area of said exhaust nozzle for said primary flow.

21. The flow duct of claim 1, wherein said non-moveable vane extends at an angle non-parallel to a longitudinal axis of the flow duct.

22. The flow duct of claim 21, wherein said non-moveable vane extends at an angle of about 45 degrees relative to the longitudinal axis of the flow duct.

23. The flow duct of claim 9, wherein said non-moveable vane extends at an angle non-parallel to a longitudinal axis of the flow duct.

24. The method 14, wherein the non-moveable vane is formed so as to extend non-parallel to a longitudinal axis of the duct.

* * * * *